United States Patent [19]  
Mancy et al.

[11] 3,875,010  
[45] Apr. 1, 1975

[54] PROCESS FOR THE PREPARATION OF DAUNORUBICIN

[75] Inventors: Denise Mancy, Val-de-Marne; Jean Florent; Jean Preud'Homme, both of Paris, all of France

[73] Assignee: Rhone-Poulenc S.A., Paris, France

[22] Filed: Nov. 17, 1969

[21] Appl. No.: 877,511

[30] Foreign Application Priority Data
Nov. 18, 1968 France .......................... 68.174206

[52] U.S. Cl............................................. 195/80 R
[51] Int. Cl............................................. C12d 9/00
[58] Field of Search ....................................... 195/80

[56] References Cited
FOREIGN PATENTS OR APPLICATIONS
985,598   3/1965   United Kingdom ................. 195/80

OTHER PUBLICATIONS
Brazhnikova et al., "Physicochemical Properties of Antitumor Antibiotic Rubomycin Produced by Actinomyes Coeruleorubidus," C.A. Vol. 66, 1967, 79521q.
DiMareo et al., "Daunomycin, A New Antibiotic of the Rhodomycin Group," C.A. Vol 61, 1964, 12394c.
DiMareo et al., "Daunomycin, an Antibiotic for Tumor Treatment," C.A. Vol 62, 1965, 16922a.
Tong et al., "Identity of Rubidomycin and Daunomycin," C.A. Vol. 68, 1968, 332239.

Primary Examiner—Joseph M. Golian
Attorney, Agent, or Firm—Stevens, Davis, Miller & Mosher

[57] ABSTRACT

The antibiotic daunorubicin is prepared by aerobically cultivating *Streptomyces bifurcus*, strain DS 23,219 (NRRL 3539), or a daunorubicin-producing mutant thereof, in an aqueous nutrient medium containing assimilable sources of carbon, nitrogen and inorganic substances, and separating daunorubicin formed during the culture.

5 Claims, No Drawings

PROCESS FOR THE PREPARATION OF DAUNORUBICIN

This invention relates to a new process for the preparation of the antibiotic daunorubicin, also known as 13,057 R.P. or rubidomycin.

In British Pat. No. 985,598 entitled "Improvements in or relating to Antibiotics and their preparation" applied for on May 16, 1963 and granted to Rhone-Poulenc S.A., the assignees of the present application, there is described the antibiotic designated 9,865 R.P., its three principal constituents designated 13,213 R.P., 13,057 R.P. (or daunorubicin) and 13,330 R.P., the preparation of the antibiotic 9,865 R.P. by culture of "Streptomyces 8,899" (NRRL 3046) or "Streptomyces 31,723" (NRRL 3045) in an appropriate medium, and the separation of the antibiotic 9,865 R.P. into its three constituents.

The formula of daunorubicin is known, inter alia by the Belgian Pat. No. 724,531, as

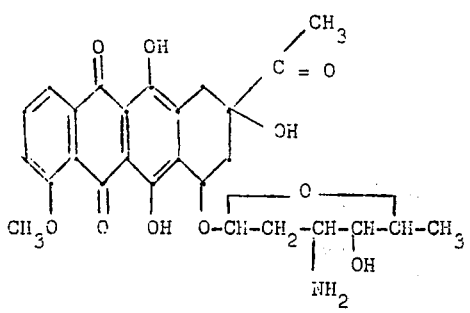

The present invention relates to a new process for the preparation of daunorubicin by cultivation under aerobic conditions of a new microorganism more completely identified hereinafter, which belongs to the genus Streptomyces. The new microorganism, designated by the name "*Streptomyces bifurcus*, strain DS 23,219", has been isolated from a soil sample taken in the Val-de-Marne department of France. A specimen of this new microorganism has been deposited in the United States Department of Agriculture, Northern Regional Research Laboratory, at Peoria, Ill., U.S.A., under the number NRRL 3539. Specimens of this microorganism may be obtained from this Laboratory on reference to the present patent application.

This new strain of Streptomyces was isolated by the following standard method: The sample of soil was suspended in sterile distilled water and the suspension diluted to different concentrations; small volumes of each dilution were spread over the surface of Petri dishes containing a suitable nutrient agar medium. After 15 days incubation at 26°C., the colonies of microorganisms to be isolated were pricked out and transplanted onto agar slopes in order to obtain more abundant cultures.

For reasons given later, the strain Streptomyces DS 23,219 must be considered as a new species, designated by the name *Streptomyces bifurcus* because of the fact that a rather peculiar form of sporophore is very frequently found in its cultures, which ends in a dichotomic division and thus presents two elongated branches attached to the end of a principal filament.

*Streptomyces bifurcus*, strain DS 23,219 forms cylindrical spores which measure 0.4 to 0.5 $\mu$./1.0 to 1.2 $\mu$. Its sporiferous filaments, which are straight or slightly flexuous, are inserted onto the aerial filaments which support them individually or in clusters containing a reduced number of elements; the principal filament frequently gives rise in its end portion to only two elongated filaments, which gives the sporophore a rather peculiar forked appearance.

Generally, *Streptomyces bifurcus*, strain DS 23,219 develops a yellowish to light pink, brownish pink or reddish brown vegetative mycelium on synthetic nutrient media, and produces soluble pigments of an orange-pink to violet-pink colour. On organic media, its vegetative mycelium is yellow-brown to orange-brown and the soluble pigments which it produces colour the agar orange-brown to reddish brown. It does not produce a melanin pigment on organic media and does not produce $H_2S$. It forms nitrites from nitrates both on organic media and on synthetic media, liquifies gelatine, slowly peptonises milk and utilises cellulose.

In Table I which follows there are given the cultural characteristics and biochemical properties of *Streptomyces bifurcus*, strain DS 23,219 on a certain number of nutrient agars and nutrient broths usually employed to examine the appearance of strains of Streptomyces. Unless otherwise stated, these characteristics and properties are those exhibited by cultures of about 2 to 3 weeks at 25°C., which have reached a good stage of development. A certain number of the culture media employed were prepared in accordance with the formulae indicated in "The Actinomycetes" (S.A. Waksman, Chronica Botanica Company, Waltham, Mass., U.S.A., 1950, p.193–197); in this case, they are indicated by the letter W followed by the number given to them in "The Actinomycetes". The references or compositions of the other culture media are as follows:

Ref. A — "Hickey and Tresner's Agar" — T. G. Pridham et al. – Antibiotics Annual, 1956–1957, p.950

Ref. B — K. L. Jones — Journal of Bacteriology, 57, 142, 1949

Ref. C — Formula W-23 with the addition of 2% of agar

Ref. D — "Yeast Extract Agar" — T. G. Pridham et al. — Antibiotics Annual, 1956–1957, p.950

Ref. E. — "Tomato Paste Oatmeal Agar" — T. G. Pridham et al. — Antibiotics Annual, 1956–1957, p.950

Ref. F. — W. E. Grundy et al. — Antibiotics and Chem. 2, 401, 1952

Reg. G — "Inorganic Salts — Starch Agar" — T. G. Pridham et al. Antibiotics Annual, 1956–1957, p.951

Ref. H — corresponds to formula W-1, with 30 g. of sucrose replaced by 15 g. of glucose Ref. I — corresponds to formula W-1, with 30 g. of sucrose replaced by 15 g. of glycerine Ref. J — "Plain gelatine" - prepared in accordance with the instructions in "Manual of Methods for Pure Culture Study of Bacteria" Society of American Bacteriologists, Geneva, N.Y., II$_{50-18}$ Ref. K — "Manual of Methods for Pure Culture Study of Bacteria" Society of American Bacteriologists, Geneva, N.Y., II$_{50-18}$ Ref. L — "Manual of Methods for Pure Culture Study of Bacteria", Society of American Bacteriologists, Geneva, N.Y., II$_{50-19}$ Ref. M — corresponds to formula W-18, with 30 g. of sucrose replaced by 15 g. of glucose Ref. N — corresponds to formula W-18, with the sucrose omitted and replaced by small strips of filter paper partially immersed in the liquid Ref. O — Skimmed milk as a commercial powder, reconstituted in accordance with the manufacturer's instructions Ref. P — "The Actinomycetes", vol. 2, p.333 — No. 42 — S. A. Waksman, The Williams and Wilkins Company, Baltimore, 1961

Ref. Q — H. D. Tresner and F. Danga — Journal of Bacteriology, 76, 239–244, 1958.

TABLE I

| Culture medium | Degree of development | Vegetative mycelium (V.m.) or underside of the culture | Aerial structure (comprising the combination of the aerial mycelium and the sporulation) | Soluble pigment | Observations and biochemical properties |
| --- | --- | --- | --- | --- | --- |
| Hickey and Tresner agar (Ref. A) | Good | V.m. light yellow brown. Well developed. | Light grey. Very moderately developed. | Very slightly pink brownish | Cylindrical spores measuring 0.4 to 0.5$\mu$./1.0 to 1.2$\mu$. Straight or slightly flexuous filaments. Frequent sporophores of bifurcated shape. |
| Bennett agar (Ref. B) | Fairly good | V.m. yellowish to light yellowish brown | Nil | Nil | |
| Emerson agar (Ref. C) | Fairly good | V.m. yellowish to light yellowish brown | Nil | Weak pink-brown | |
| Pridham yeast extract agar (Ref. D) | Good | V.m. light orange-brown | Light blue-grey. Moderately developed. | Light reddish orange-brown | |
| Pridham oat and tomato agar (Ref. E) | Good | V.m. light orange-brown | Blue-grey. Fairly well developed. | Orange-brown | |
| Glucose-peptone agar (W-6) | Fairly good | V.m. brownish orange | Nil | Slightly pink orange-brown | |
| Nutrient agar (W-5) | Very moderate | V.m. light brownish yellow | Nil | Nil | |
| Krainsky calcium malate agar (Ref. F) | Moderate | V.m. colourless to light brownish pink | Nil | Light greyish pink | Good solubilisation of the calcium malate |
| Ovalbumin agar (W-12) | Poor | V.m. colourless to light pink | Nil | Nil | |
| Glucose-asparagine agar (W-2) | Fairly good | V.m. light orange-brown to light red-brown | Blue-grey. Very moderately developed. | Light reddish orange. | |
| Glycerine-asparagine agar (W-3) | Fairly good | V.m. pink brown-yellow to red | Pink-grey to blue-grey. Very poorly developed. | Orange-pink to red | |
| Starch-nitrate agar (W-10) | Moderate | V.m. reddish pink to light pink-brown | Light greyish. Poorly developed. | Light violet pink-brown | Hydrolysis of the starch: positive |
| Pridham starch agar (Ref. G) | Fairly good | Underside reddish orange-brown | Light bluish grey to light pink-grey. Moderately developed. | Light reddish brown | Cylindrical spores measuring 0.4 to 0.5$\mu$./1.0 to 1.2$\mu$. Straight or slightly flexuous sporiferous filaments. Frequent sporophores of bifurcated shape. Hydrolysis of the starch: positive |
| Czapek synthetic agar with sucrose (W-1) | Good | V.m. light yellowish to reddish pink | Nil | Violet-pink | |
| Czapek synthetic agar with glucose (Ref.H) | Good | V.m. light yellowish to light pink-brown | Nil | Pale pink to Pale orange | |
| Czapek synthetic agar with glycerine (Ref.I) | Good | V.m. violet-red | Pink-grey to violet-grey. Moderately developed. | Intense purple-violet. Abundant | |
| Culture on potato (W-27) | Good | V.m. very well developed, very thick and very wrinkled. Light brownish to light reddish brown | Nil | Reddish brown | |
| 12% Pure gelatin (Ref.J) | Moderate | V.m. whitish | Nil | Nil | Liquefaction positive |

TABLE I —Continued

| Culture medium | Degree of development | Vegetative mycelium (V.m.) or underside of the culture | Aerial structure (comprising the combination of the aerial mycelium and the sporulation) | Soluble pigment | Observations and biochemical properties |
| --- | --- | --- | --- | --- | --- |
| Nutrient broth containing nitrate (Ref.K) | Fairly good | Yellowish ring | Nil | Nil | Reduction of nitrates to nitrites: strongly positive |
| Dimmick glucose-nitrate broth (Ref. L) | Moderate | Small greyish colonies agglomerating on the surface | Nil | Nil | Reduction of nitrates to nitrites: positive |
| Czapek broth with sucrose (W-18) | Medium | Pink velum, thick, well developed | Nil | Nil | Reduction of nitrates to nitrites: positive |
| Czapek broth with glucose (Ref. M) | Medium | Pink velum | Nil | Nil | Reduction of nitrates to nitrites: positive |
| Czapek broth with cellulose (Ref. N) | Medium | Small pink-white colonies on the paper protruding from the broth | Pink-white | Nil | Reduction of nitrates to nitrites: positive-Utilisation of the cellulose: positive |
| Skimmed milk (Ref. O) | Good | Yellowish ring | Nil | | No coagulation. Peptonisation slow, only starting after one month's culture. pH unchanged in 1 month. |
| Tyrosine-yeast extract agar for the formation of melanin (Ref. P) | Moderate | Light brownish pink | Pink-white to pink-grey. Moderately developed. | Light brownish pink | Formation of melanin: negative |
| Tresner and Danga agar (Ref. Q) | Good | Light brownish yellow | Nil | Light brownish yellow | Production of $H_2S$: negative |

The capacity of *Streptomyces bifurcus*, strain DS 23,219, to utilise various sources of carbon and nitrogen to ensure its development has been determined in accordance with the principle of the method of Pridham and Gottlieb (J. of Bact. 56, 107–114, 1948). The degree of development was observed on the base medium indicated by the authors, either replacing the glucose by the various sources of carbon respectively tested, or replacing the $(NH_4)_2SO_4$ by the various sources of nitrogen respectively tested. The results are indicated in the following Table.

TABLE II

| Sources of carbon tested | Utilisation | Sources of nitrogen tested | Utilisation |
| --- | --- | --- | --- |
| D-Xylose | + | NaNO$_3$ | + |
| L-Arabinose | + | NaNO$_2$ | + |
| L-Rhamnose | + | $(NH_4)_2SO_4$ | + |
| D-Glucose | + | $(NH_4)_2HPO_4$ | + |
| D-Galactose | + | Adenine | + |
| D-Fructose | + | Adenosine | + |
| D-Mannose | + | Uracil | + |
| L-Sorbose | — | Urea | + |
| Lactose | + | L-Asparagine | + |
| Maltose | + | Glycine | + |
| Sucrose | + | Sarcosine | + |
| Trehalose | + but slow | DL-Alanine | + |
| Cellobiose | + | DL-Valine | + |
| Raffinose | + | DL-Aspartic acid | + |
| Dextrin | + | L-Glutamic acid | + |
| Inulin | + | L-Arginine | + |
| Starch | + | L-Lysine | + |
| Glycogen | + | DL-Serine | + |
| Glycerine | + | DL-Threonine | + |
| Erythritol | — | DL-Methionine | — |
| Adonitol | — | Taurine | — |
| Dulcitol | — | DL-Phenylalanine | + but slow |
| D-Mannitol | + | L-Tyrosine | + |
| D-Sorbitol | + | DL-Proline | + |
| Inositol | + | L-Hydroxyproline | + |
| Salicin | + | Betaine | + |

The combination of characteristics which *Streptomyces bifurcus*, strain DS 23,219 presents does not allow it to be identified with any of the species already described, and for this reason it must be considered as representing a new species.

In fact, following the classification of the Streptomyces indicated in Bergey's Manual of Determinative Bacteriology (7th edition — The Williams and Wilkins Company, Baltimore, 1957), its properties of not elaborating a melanin pigment on organic media, of forming a reddish brown soluble pigment on potato and of developing also a light reddish brown vegetative mycelium on potato, make it approach *Streptomyces noursei*; however, it has no relationship to the latter, which produces spiral sporophores and of which the sporulated serial mycelium assumes a pink tint, whereas *Streptomyces bifurcus*, strain DS 23,219 only produces non-spiral sporiferous filaments and shows a light blue-grey sporulated aerial mycelium.

In "The Actinomycetes" (vol. 2, S. A. Waksman, the Williams and Wilkins Company, Baltimore, 1961 — page 158) there are described three other species sharing with *Streptomyces noursei* the property of not forming a melanin pigment on organic media, of elaborating a reddish soluble pigment on potato and of forming a pink to reddish vegetative mycelium on potato: *Streptomyces albogriseolus*, *Streptomyces spiralis* and *Streptomyces fragilis*. However, these three species show essential differences in properties from the strain *Streptomyces bifurcus*, strain DS 23,219, proving that they are indisputably species to which it cannot correspond: *streptomyces albogriseolus* and *Streptomyces spiralis* form spiral sporophores, thereby placing them in the section Spira of Pridham's classification, whilst *Streptomyces bifurcus*, strain DS 23,219, which only produces straight or slightly flexuous sporiferous filaments, belongs to the section Rectus-Flexibilis of this same classification. As regards *Streptomyces fragilis*, the pink colour which its aerial mycelium assumes when it reaches sporulation shows that it is unrelated to *Streptomyces bifurcus*, strain DS 23,219 of which the aerial mycelium, as already stated, assumes a light blue-grey colour when it is sporulated.

*Streptomyces bifurcus*, strain DS 23,219 can thus not be identified with any of the strains which come closest to it.

The new process for the preparation of daunorubicin according to the present invention comprises aerobically cultivating *Streptomyces bifurcus*, strain DS 23,219 (NRRL 3539), or a daunorubicin-producing mutant thereof, using an aqueous nutrient medium containing assimilable sources of carbon, nitrogen and inorganic substances, and separating the antibiotic daunorubicin formed during the culture.

The cultivation of *Streptomyces bifurcus*, strain DS 23,219 by fermentation essentially produces daunorubicin, but the other constituents 13213 R.P. and 13330 R.P. of the antibiotic 9865 R.P. are also produced. They are separated from daunorubicin during the course of the extraction and purification operations and may optionally be isolated, but the main object of the present invention is the preparation of daunorubicin.

The culture of *Streptomyces bifurcus*, strain DS 23,219 may be carried out by any of the known aerobic surface or submerged culture methods, the latter being preferred because they are more convenient. Conventional types of apparatus currently used in the fermentation industry may be employed.

In particular, the following sequence of operations may be adopted:

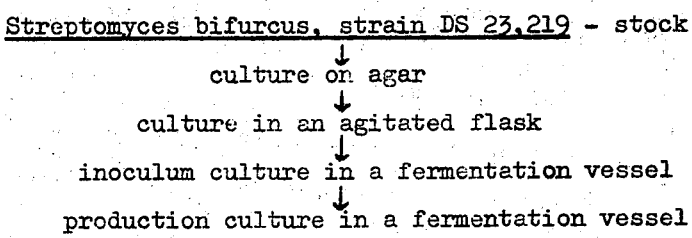

The fermentation medium must contain assimilable sources of carbon, nitrogen and inorganic substances, and optionally growth-promoting factors; all these ingredients may be supplied as well-defined products or complex mixtures, such as are found in natural biological products of various origins.

As the assimilable source of carbon there may be used carbohydrates such as glucose, maltose, dextrins, starch or other carbon-, hydrogen- and oxygen-containing substances such as the sugar alcohols, e.g. mannitol, or certain organic acids, e.g. lactic or citric acid. Certain animal or vegetable oils such as lard oil or soyabean oil may be advantageously used instead of, or in admixture with, carbon-, hydrogen- and oxygen-containing substances.

A very wide range of suitable sources of assimilable nitrogen is available. The sources may be very simple chemical compounds such as nitrates, inorganic and organic ammonium salts, urea, or amino-acids. They may also be complex substances containing principally nitrogen in protein form, e.g. casein, lactalbumin, gluten and their hydrolysates, soyabean flour, peanut meal, fish meal, meat extract, yeast extract, distillers' solubles and corn steep liquor.

Of the inorganic substances added, some may have a buffering or neutralising effect, such as the alkali metal phosphates or alkaline earth metal phosphates, or the carbonates of calcium and magnesium. Others contribute to the ionic equilibrium needed for the development of *Streptomyces bifurcus*, strain DS 23,219 and for the production of the antibiotic; examples of these are the chlorides and sulphates of the alkali metals and alkaline earth metals. Finally, some of them act more especially as activators of the metabolism of *Streptomyces* DS 23,219: to these belong the salts of zinc, cobalt, iron, copper and manganese.

The pH of the fermentation medium at the beginning of the culture should be within the range of 6.0 to 7.8, and preferably from 6.5 to 7.5. The optimum fermentation temperature is 25°–30°C., but satisfactory production is achieved at temperatures of from 23° to 33°C. The rate of aeration of the fermentation vessels may vary between quite wide limits, but is has been found that an aeration rate of 0.3 to 3 litres of air per litre of broth per minute is particularly suitable. The maximum yield of antibiotic is obtained after 2 to 8 days of growth, but the period depends predominantly on the medium used.

From the foregoing it will be realised that the general conditions for the culture *Streptomyces bifurcus*, strain DS 23,219 for the production of daunorubicin may be widely varied and adapted as appropriate to the circumstances.

Daunorubicin may be isolated from the fermentation broths by various methods. The culture broth can be filtered at a pH between 1.5 and 9 and, under these conditions, the major part of the active material passes into the filtrate. After washing with water, the filter cake retains practically no active material. It is advantageous to carry out this operation in acid medium, and particularly one acidified with oxalic acid to a pH between 1.5 and 2. It is also possible to carry out the filtration at a pH between 2 and 7, preferably near to 2, in the presence of an aliphatic alcohol containing from 1 to 3 carbon atoms.

In these extraction operations, daunorubicin is obtained in aqueous or aqueous-alcoholic solution, and it is then brought into organic solution by extraction with a water-immiscible organic solvent such as butanol, methyl isobutyl ketone, ethyl acetate or chloroform, at a pH between 5.5 and 9, preferably about 7.5. This extraction is optionally preceded by a treatment on an ion-exchange resin, in which case the aqueous solution is adjusted to a pH of about 4 and then treated with a cation exchange resin. Daunorubicin is eluted, preferably with methanol containing 10% of water and 1% of sodium chloride. The eluate is then concentrated to remove the alcohol and extracted as described above.

The fermentation broth may also be directly extracted with a water-immiscible organic solvent such as butanol, ethyl acetate or chloroform, at a pH between 5.5 and 9, preferably about 7.5. In this case, all the active material passes into the organic phase, which is separated from the aqueous phase by the usual methods.

Whatever the method of extraction chosen, daunorubicin is finally obtained in organic solution. It may be advantageous at this stage to purify the antibiotic by successively bringing it into aqueous solution and then into organic solution by varying the pH. The crude antibiotic may be isolated from the organic solution last obtained by concentration or precipitation with a poor solvent for the antibiotic such as hexane.

To obtain daunorubicin in a purer state, all the usual methods may be employed, such as chromatography on various adsorbent substances, counter-current distribution or partition between various solvents.

Daunorubicin may also be converted to acid addition salts by treatment with acids, for example hydrochloric acid. Such salts may be purified by application of conventional methods.

Daunorubicin obtained by this new method and its acid addition salts exhibits characteristics identical to those of the antibiotic 13057 R.P., and of its acid addition salts, described in British Patent No. 985,598.

The following Examples illustrate the invention.

EXAMPLE 1

Peptone (1200 g.), meat extract (600 g.), Cerelose (1200 g.), agar (240 g.) and tap water (sufficient to make up to 110 litres) are introduced into a 170-litre fermentation vessel.

After the pH of the mixture has been adjusted to 7.20 with 10N sodium hydroxide solution (120 cc.), the medium is sterilised by bubbling steam at 122°C. through it for 40 minutes. After cooling, the volume of the broth is 120 litres and the pH is 6.65. The broth is then inoculated with a culture (200 cc.) in an agitated Erlenmeyer flask of *Streptomyces bifurcus*, strain DS 23,219 (NRRL 3539). The culture is developed at 27°C. for 30 hours with agitation and aeration with sterile air; it is then ready for inoculation of the production culture.

The production culture is carried out in an 800-litre fermentation vessel charged with distillers' solubles (4 kg.), shelled beans (12 kg.), soya bean oil (8 litres), sodium chloride (2 kg.), cobalt chloride. 6 $H_2O$ (8 g.), and tap water (sufficient to make up to 330 litres). After adjustment of the pH of the mixture to 7.70 with 10N sodium hydroxide solution (400 cc.), the medium us sterilised by bubbling steam at 122°C. through it for 40 minutes. After cooling, the volume of the broth is 360 litres. It is made up to 400 litres by addition of a sterile aqueous solution (40 litres containing Cerelose (6 kg.). The pH is then 6.80.

The broth is then inoculated with 40 litres of the inoculum culture described above from the 170-litre fermentation vessel. The production culture is carried out at 27°C. for 170 hours with agitation, using a motor revolving at 260 revolutions per minute, and aeration with a flow of 30 $m^3$/hr. of sterile air. The pH of the culture medium is then 7.30 and the volume of the broth is 305 litres. The quantity of daunorubicin (13,057 R.P.) present in the medium is 22.5 ug./cc.

EXAMPLE 2

200 Litres of the culture broth obtained from the fermentation described in Example 1 are placed in a vat equipped with a stirrer and a steam heating coil. Oxalic acid (6 kg.) is added and the mass is stirred and heated to 50°C. The stirring and the said temperature are maintained for 1 hour 30 minutes, after which time a filtration adjuvant (30 kg.) is added and then the suspension is filtered on a filter-press. The filter cake is washed on the filter with water (100 litres). The filtrate, the volume of which is 260 litres, is cooled to +15°C. and the pH is adjusted to 4.5 by addition of 10% sodium hydroxide solution.

The filtrate is passed through a column containing Amberlite IRC-50 (6 litres) in acid form so as to pass through the resin bed from the top downwards at a flow rate of 15 litres/hour. The column is then washed with water (30 litres) circulating in the same direction as the filtrate and at the same flow rate, followed by methanol containing 50% of water (30 litres) at a flow rate of 15 litres/hour circulating from the bottom upwards and then with methanol containing 10% off water (50 litres) again at the same flow rate and from the bottom upwards.

The effluent and the washings are discarded, and the column is eluted with a solution circulating from the top downwards through the resin, the solution consisting of sodium chloride (10 g.), water (100 cc.) and methanol (sufficient to make up to 1000 cc.). The eluate is collected as soon as an orange-red colouration appears and until this colour disapppears. A volume of 50 litres is thus obtained, which contains the major part of the antibiotic. The eluate is concentrated under reduced pressure (2 mm.Hg) at 35°C. to a volume of 10 litres.

The concentrate is successively extracted at pH 8.5 with 3 amounts of chloroform (5 litres each). The chloroformic extract is concentrated at 30°C. under reduced pressure (5 mm.Hg) to a volume of 50 cc. The antibiotic is precipitated in the form of the base by addition of hexane (500 cc.), and is then filtered off washed and dried to give finally a crude base (4.9 g.) containing 64% of daunorubicin.

EXAMPLE 3

The product (6.8 g.), obtained as described in Example 2 containing 64% of daunorubicin, is suspended in water (40 cc.) and dissolved by progressively adding 1N hydrochloric acid (7 cc.). The solution is clarified by filtration and daunorubicin hydrochloride crystallised by the slow addition of acetone (1 litre). The crystals thus obtained are filtered off, washed with acetone (50 cc.) and dried at 50°C. under reduced pressure (5 mm.Hg) for 15 hours. A crystalline hydrochloride (3.3 g.), titrating 90% of daunorubicin, is obtained in a yield of 68%.

EXAMPLE 4

The product obtained as described in Example 3 (3 g.) is dissolved in methanol (10 cc.) and chloroform (100 cc.) is then added progressively, causing the daunorubicin hydrochloride to recrystallise. The crystals thus obtained are filtered off, washed with chloroform (20 cc.) and dried at 50°C. under reduced pressure (5 mm.Hg) for 15 hours to give the recrystallised hydrochloride (1.8 g.) containing 90% of daunorubicin. Treatment of the crystallisation mother liquors with hexane (200 cc.) caused the precipitation of a second quantity of daunorubicin. After filtration, washing with hexane (50 cc.) and drying at 50°C. under reduced pressure (5 mm.Hg.), daunorubicin (1 g.), which can be recycled under the conditions of Example 3, is obtained.

EXAMPLE 5

Daunorubicin hydrochloride (2.4 g.), obtained as described in Example 4, is suspended in butanol (40 cc.). After half an hour's stirring, the crystals are filtered off, washed with butanol (10 cc.) and dried at 60°C. under reduced pressure (0.5 mm.Hg) for 8 hours. Pure daunorubicin hydrochloride (2.1 g.) is obtained in a yield of 88%.

We claim:

1. Process for the production of daunorubicin which comprises aerobically cultivating *Streptomyces bifurcus*, strain DS 23,219 (NRRL 3539), or a daunorubicin-producing mutant thereof, using an aqueous nutrient medium containing assimilable sources of carbon, nitrogen and inorganic substances, and separating daunorubicin formed during the culture.

2. Process according to claim 1 in which the culture is effected under submerged aerobic culture conditions commencing at a pH within the range of 6.0 to 7.8 at a temperature of from 23° to 33°C.

3. Process according to claim 2 in which the pH of the nutrient medium at the beginning of the culture is from 6.5 to 7.5.

4. Process according to claim 2 in which the temperature of the culture is 25° to 30°C.

5. Process according to claim 2 in which the culture medium is aerated at a rate of from 0.3 to 3 litres of air per litre of medium per minute.

* * * * *